US012740573B2

(12) United States Patent
Jackson et al.

(10) Patent No.: US 12,740,573 B2
(45) Date of Patent: Sep. 22, 2026

(54) MILK AND OAT FOOD PRODUCT

(71) Applicant: Midwest Yogurt, Inc., Minnetonka, MN (US)

(72) Inventors: Eric Wayne Jackson, Rockford, MN (US); Jie Sun, Plymouth, MN (US)

(73) Assignee: MIDWEST YOGURT, INC., Minnetonka, MN (US)

( * ) Notice: Subject to any disclaimer, the term of this patent is extended or adjusted under 35 U.S.C. 154(b) by 1494 days.

(21) Appl. No.: 17/049,808

(22) PCT Filed: Jun. 25, 2019

(86) PCT No.: PCT/US2019/038969
§ 371 (c)(1),
(2) Date: Oct. 22, 2020

(87) PCT Pub. No.: WO2020/005930
PCT Pub. Date: Jan. 2, 2020

(65) Prior Publication Data

US 2021/0368815 A1 Dec. 2, 2021

Related U.S. Application Data

(60) Provisional application No. 62/690,070, filed on Jun. 26, 2018.

(51) Int. Cl.
*A23C 9/13* (2006.01)
*A23B 2/10* (2025.01)
*A23B 11/10* (2025.01)
*A23C 9/133* (2006.01)

(52) U.S. Cl.
CPC ............ *A23C 9/1315* (2013.01); *A23B 2/103* (2025.01); *A23B 11/10* (2025.01); *A23C 9/1307* (2013.01); *A23C 9/133* (2013.01); *A23C 2210/15* (2013.01); *A23V 2002/00* (2013.01)

(58) Field of Classification Search
CPC ..... A23C 9/1315; A23C 9/1307; A23C 9/133; A23C 3/00; A23L 3/0155
See application file for complete search history.

(56) References Cited

U.S. PATENT DOCUMENTS

| | | | |
|---|---|---|---|
| 3,950,544 A | 4/1976 | Fridman | |
| 5,055,309 A | 10/1991 | Saita et al. | |
| 5,654,025 A | 8/1997 | Raghunath et al. | |
| 5,762,989 A | 6/1998 | Savello | |
| 5,820,903 A | 10/1998 | Fleury et al. | |
| 5,932,272 A | 8/1999 | Raemy et al. | |
| 5,979,300 A | 11/1999 | Donovan | |
| 6,399,122 B2 | 6/2002 | Vandeweghe et al. | |
| 7,829,130 B2 | 11/2010 | Tossavainen et al. | |
| 7,854,950 B2 | 12/2010 | Carroll et al. | |
| 9,040,107 B2 | 5/2015 | Bennett et al. | |
| 2004/0126480 A1* | 7/2004 | Lelieveld | A23L 3/0155 426/665 |
| 2013/0017300 A1* | 1/2013 | Avila | A23C 9/1544 426/507 |
| 2016/0106125 A1* | 4/2016 | Rascon | A23L 7/115 426/627 |
| 2016/0309732 A1 | 10/2016 | Gugger et al. | |
| 2017/0105379 A1 | 4/2017 | Jackson | |
| 2019/0159488 A1 | 5/2019 | Thompson et al. | |

FOREIGN PATENT DOCUMENTS

| | | |
|---|---|---|
| DE | 19814781 | 10/1999 |
| WO | WO 2019/070859 | 4/2019 |

OTHER PUBLICATIONS

Camilla, "No-Cook, Overnight Steel Cut Oat", PowerHungry, Published Aug. 26, 2015, Retrieved from Internet URL: https://www.powerhungry.com/2015/08/26/no-cook-overnight-steel-cut-oats/. (Year: 2015).*

DE 19814781 A1 English Translation. (Year: 1999).*

Adda, "Oats 101: Nutrition Facts and Health Benefits", Healthline, Aug. 5, 2017, Retrieved from Internet URL: https://web.archive.org/web/20170805204204/https://www.healthline.com/nutrition/foods/oats#section1. (Year: 2017).*

Angioloni et al., "*Effects of Pressure Treatment of Hydrated Oat, Finger Millet and Sorghum Flours on the Quality and Nutritional Properties of Composite Wheat Breads*", Journal of Cereal Science, vol. 56, No. 3, pp. 713-719, 2012.

Ozyurt et al./, "*Effect of Food Processing on the Physicochemical Properties of Dietary Fibre*", ACTA Sci. Po. Technol. Aiment., vol. 15, No. 3, pp. 233-245, 2016.

* cited by examiner

*Primary Examiner* — Stephanie A Kohler
(74) *Attorney, Agent, or Firm* — McAndres, Held & Malloy, Ltd.

(57) ABSTRACT

Food compositions comprising a milk ingredient and oats are described. Food compositions described provide a convenient alternative to overnight oats. Food products containing food compositions that include a milk ingredient and oats, as well as methods of making and using such food compositions and food products are also described.

17 Claims, No Drawings

MILK AND OAT FOOD PRODUCT

CROSS-REFERENCE TO RELATED APPLICATIONS

This application represents a National stage application of PCT/US2019/038969 filed as "Milk and Oat Food Product", on Jun. 25, 2019 (retitled by the International Search Authority to "Milk and Oat Food Product as a Method of Making a Packaged Food Product", pending, which claims priority to U.S. patent application Ser. No. 62/690,070, filed Jun. 26, 2018, expired. The entire contents of these applications are incorporated by reference.

BACKGROUND

Consumers are increasingly looking for healthy food options that can also provide convenience. Oats are an example of a healthy food option. Oats contribute several benefits to a healthy diet, including contributing to fiber and providing more protein than most other grains. Beta glucan in oats has been associated with improved heart health, and may contribute to lower blood cholesterol and triglycerides.

One popular food that uses oats as a central ingredient is what is sometimes referred to "overnight oats." Overnight oats are generally oats, such as rolled oats, that have been combined with a milk ingredient and allowed to soak, typically in refrigerated conditions for several hours, to soften the oats before consumption. Overnight oats provide consumers with a way to eat oats that provides an eating experience that differs from oatmeal or porridge, where the oats are combined with a liquid, such as a milk ingredient or water, and then heated. One way that overnight oats differ from oatmeal is that the soaked oats have a different, chewier texture than the cooked oats in oatmeal. In addition, overnight oats have a flavor that differs from oatmeal or porridge, providing a more uncooked oat flavor than oatmeal or porridge. Many consumers enjoy these differences, but overnight oats require pre-planning and several hours of soaking to achieve a consistency that such consumers enjoy. As a result, if a consumer forgets to combine oats with a milk ingredient ahead of time, they generally miss out on having a serving of overnight oats at the desired time.

Three available types of products attempt to provide a convenient version of overnight oats. However, each has significant drawbacks, leaving consumers without a convenient overnight oat option. A first type of product is a single serving container with oats, typically rolled oats, and other dry ingredients, designed to have a milk ingredient or other wet ingredient added by the consumer before consumption. This type of product still has the problem of requiring a soaking time after the addition of the milk ingredient and before consumption.

A second type of product is a room temperature stable product that contains oats and a liquid ingredient. This type of product is generally thermally treated to provide shelf stability, which results in a flavor more like a cooked oatmeal or porridge rather than overnight oats. In addition, oats in this type of product tend to soften and/or disintegrate too much, resulting in a product that does not provide the desired texture of overnight oats.

A third type of product is a refrigerated product containing yogurt or yogurt-like product mixed with oats, usually rolled oats. This type of product is generally made by soaking oats in a non-milk liquid, such as water or fruit juice in order to soften the oats, then combining the soaked oats with yogurt or a yogurt-like product. However, this type of product tends to exhibit syneresis and/or undesired microbial growth (e.g., yeast or mold) over the refrigerated shelf life of the product. While the product is still generally safe to consume over a 60 day shelf life, these issues can negatively impact the flavor, appearance, and overall eating experience of the product.

Thus, while there are several food products that include oats and provide some level of convenience, such as those described above, as well as ready-to-eat cereals and snack bars, there is still a consumer need for more options in foods that can provide benefits from oats yet also provide a convenient and pleasant eating experience.

SUMMARY

The present disclosure relates to convenient oat and milk ingredient products providing an eating experience similar to overnight oats.

Provided herein are food products having shelf stability at 4° C. of at least 60 days. A food product provided includes a food composition that includes a milk ingredient and oats, where the oats are included in an amount of about 10% to about 25% by weight of the food product. The food composition has a pH of 4.8 or less, and a texture comprising a firmness of at least 400 g force or peak force of at least 500 g force. A food product provided herein can optionally be enclosed in a container or packaging, such as a bulk package or an individual serving package.

A milk ingredient included in a food composition can be an animal-based or plant-based milk ingredient. In some embodiments, a milk ingredient included in a food composition can be a fermented milk, such as a yogurt.

In some embodiments, a food composition can further include up to 10% of a fruit ingredient, a sweetener, or a combination thereof. In some embodiments, a food composition can include up to 5% of a fruit ingredient, up to 5% of a sweetener, or a combination thereof.

In some embodiments, a food composition can further comprise up to 20% inclusions.

In some embodiments, a food composition consists essentially of the milk ingredient and the oats. In some embodiments, a food composition consists essentially of the milk ingredient, the oats, and an acidulent.

In some embodiments, oats in a food composition provided herein can comprise oats having an absorption rate of less than 60 grams water per 50 grams oats. In some embodiments, oats in a food composition provided herein can comprise at least 50% oats having an absorption rate of less than 60 grams water per 50 grams oats. In some embodiments, oats in a food composition provided herein can comprise at least 25% oats having an absorption rate of 20 grams water per 50 grams oats or less.

In some embodiments, oats in a food composition provided herein can comprise oats having a protein content of at least 18% by weight of the oats.

In some embodiments, a food composition provided herein can have a slowly digestible starch content of at least 3% by dry weight basis of the food composition. In some embodiments, a food composition provided herein can have a fiber content of at least 1.5% by weight of the food composition. In some embodiments, a food composition provided herein can have a protein content of at least 5% by weight of the food composition.

In some embodiments, a food composition provided herein can include a live and active culture.

Also provided herein are methods of making a food product. A method provided herein includes providing a packaged food composition including a package, and a food composition enclosed in the package, where the food composition includes a milk ingredient and oats, with an oat content of from about 10% to about 25% by weight of the food composition, and where the food composition has a pH of 4.8 or less, and a texture comprising a firmness of at least 200 g force or peak force of at least 500 g force, and treating the packaged food composition to high pressure pasteurization under conditions sufficient to produce the packaged food product, where the packaged food product having shelf stability at 4° C. of at least 60 days.

In some embodiments, high pressure pasteurization conditions include a pressure of at least 580 MPa, or from 580 MPa to about 660 MPa. In some embodiments, high pressure pasteurization conditions include maintaining the pressure for a duration of at least 2 minutes. In some embodiments, high pressure pasteurization conditions include maintaining the pressure at about 590 MPa for a duration of at least 6 minutes, or from about 6 minutes to about 15 minutes.

In some embodiments of a method provided herein, the milk ingredient can comprise a fermented milk, such as a yogurt.

In some embodiments of a method provided herein, a food composition can further include up to 10% of a fruit ingredient, a sweetener, or a combination thereof. In some embodiments, the food composition can include up to 5% of a fruit ingredient, up to 5% of a sweetener, or a combination thereof.

In some embodiments of a method provided herein, a food composition can further include up to 20% inclusions.

In some embodiments of a method provided herein, a food composition consists essentially of the milk ingredient and the oats. In some embodiments of a method provided herein, a food composition consists essentially of the milk ingredient, the oats, and an acidulent.

In some embodiments of a method provided herein, oats in a food composition provided herein can comprise oats having an absorption rate of less than 60 grams water per 50 grams oats. In some embodiments, oats in a food composition provided herein can comprise at least 50% oats having an absorption rate of less than 60 grams water per 50 grams oats. In some embodiments, oats in a food composition provided herein can comprise at least 25% oats having an absorption rate of 20 grams water per 50 grams oats or less.

In some embodiments of a method provided herein, oats in a food composition provided herein can comprise oats having a protein content of at least 18% by weight of the oats.

In some embodiments of a method provided herein, a food composition provided herein can have a slowly digestible starch content of at least 3% by dry weight basis of the food composition. In some embodiments, a food composition provided herein can have a fiber content of at least 1.5% by weight of the food composition. In some embodiments, a food composition provided herein can have a protein content of at least 5% by weight of the food composition.

In some embodiments of a method provided herein, a packaged food product includes a live and active culture.

In some embodiments of a method provided herein, the packaged food composition can be enclosed in a bulk container or an individual serving container.

These and various other features and advantages will be apparent from a reading of the following detailed description.

DETAILED DESCRIPTION

The present invention provides a convenient food product that has an eating experience, including a texture and a flavor, that is similar to overnight oats, without most or all of the disadvantages of the previously available products. It was discovered, and is disclosed herein, that oats, combined with a milk ingredient, can be treated with high pressure pasteurization to result in a refrigerator stable product with a desired flavor and texture. Importantly, high pressure pasteurization conditions are selected to achieve sufficient moisture incorporation into oats to mimic the texture of soaked oats in overnight oats without making them too soft. An added benefit of the selected high pressure pasteurization conditions is that the resulting product has a shelf stability at 4° C. of at least 60 days (e.g., at least 75 days, or at least 90 days).

As used herein, a shelf stable product refers to a product in which mold and yeast (as measured by U.S. Food and Drug Administration Laboratory Method BAM 18: Yeasts, Molds and Mycotoxins, April 2001), and coliform bacteria (as measured by U.S. Food and Drug Administration Laboratory Method BAM 4: Enumeration of *Escherichia coli* and the Coliform Bacteria, September 2002, as revised July 2017), are present at less than 10 cfu per gram over the designated time at the designated temperature.

Provided herein is a food product, the food product having shelf stability at 4° C. of at least 60 days (e.g., at least 70 days, or at least 90 days) and comprising a food composition including a milk ingredient and oats. A milk ingredient is included in a food composition provided herein in an amount of from about 30% to about 80% (e.g., about 50% to about 80%, or about 70% to about 80%) by weight of the food composition. As used herein, a milk ingredient includes any milk, such as animal's milk (e.g., cow's milk, goat's milk, sheep's milk, and the like), nut-based milk (e.g., almond milk, coconut milk, and the like), legume-based milk (e.g., soy milk, pea milk, and the like), grain-based milk (e.g, rice milk, oat milk, and the like), or other plant- or animal-based milk, or a product made from such a milk, such as cream, fermented milk (e.g., yogurt, kefir, or the like), powders that have been rehydrated, or any combination thereof. In some embodiments, a milk ingredient has a moisture content of 80% to 99% (e.g., from about 84% to about 98%) by weight. In some embodiments, a milk ingredient has a water activity of about 0.90 to about 1 (e.g., about 0.96 to about 0.99).

Oats are included in a food composition provided herein in an amount of from about 10% to about 30% (e.g., about 12% to about 20%, or about 15% to about 25%) by weight of the food composition. Any species or oat variety suitable for consumption can be used in a food composition. For example, various cultivars and varieties of common oats (*Avena sativa*), red oats (e.g., *Avena byzantina*), black oats (e.g., *Avena strigosa*), Hungarian oats (*Avena orientalis*), naked oats, and other oat species (e.g., *Avena magna, Avena brevis*), or combinations thereof, are all suitable for use.

Preferably, oats included in a food composition are rolled oats. As used herein, the term "rolled oats" refers to oats that have been pressed into a flat shape relative to a hulled, but otherwise unprocessed, oat kernel. Rolled oats are typically produced by steaming hulled oat kernels to make them more pliable and then pressing them, e.g., between rollers, to achieve a more or less flattened kernel (e.g., flakes ranging from about 0.25 to about 1.8 mm thick, or about 0.35 to about 1.6 mm thick). In some cases, rolled oats are roasted either before or after being flattened, or can be roasted both before and after being flattened. Rolled oats are often identified as rolled oats, but can also be described as "porridge oats," "old fashioned oats," "whole oats," or "jumbo oats."

It was discovered that including oats an absorption rate of less than 60 grams water per 50 grams oats in a food composition provided herein can provide a more complex texture after high pressure pasteurization, which may be desired in some cases, and can increase visual distinguishability of individual oats within the food composition. In some embodiments, at least a portion (e.g., 10% to 100%, about 30% to about 80%, about 45% to about 60%, or about 50%) of the oats included in a food composition provided herein are oats having an absorption rate of less than 60 grams water grams water per 50 grams oats (e.g., less than about 40 grams water per 50 grams oats, less than about 30 grams water per 50 grams oats, or less than about 20 grams water per 50 grams oats). In some embodiments, oats included in a food composition includes a blend of oats, where a portion of the oats have an absorption rate of less than 50 grams water per 50 grams oats and a portion of the oats have an absorption rate of greater than 50 grams water per 50 grams oats. In some embodiments, oats included in a food composition includes a blend of oats, where a portion of the oats have an absorption rate of less than 30 grams water per 50 grams oats and a portion of the oats have an absorption rate of greater than 30 grams water per 50 grams oats. In some embodiments, oats included in a food composition includes a blend of oats, where a portion of the oats have an absorption rate of less than 20 grams water per 50 grams oats and a portion of the oats have an absorption rate of greater than 20 grams water per 50 grams oats.

As used herein, absorption rate is measured on rolled oats. As used herein, the method for measuring absorption rate in oats is the American Association of Cereal Chemists International Water Hydration (Absorption) of Rolled Oats method (AACCI Method 56-40.01, Approved Sep. 16, 1998).

In some embodiments, at least a portion (e.g., 10% to 100%, 30% to 80%, about 45% to about 60%, or about 50%) of the oats have protein content of at least 18% (e.g., at least 20%, or at least 22%) by weight. Oats having a protein content of at least 18% by weight are described in U.S. Patent Publication No. 2017/0105379, the contents of which are incorporated herein by reference in their entirety.

In some embodiments, a food composition provided herein can include a fruit ingredient and/or a sweetener. A fruit ingredient and a sweetener can be included in a food composition provided herein in combined amount of up to about 10% by weight of the food composition. For example, if a fruit ingredient is included in an amount of 5% by weight of a food composition, a sweetener can be included in an amount of up to 5% (i.e., 0 to about 5%) by weight of the food composition. In another example, if a sweetener is included in an amount of 7% by weight of a food composition, a fruit ingredient can be included in an amount of up to 3% (i.e., 0 to about 3%) by weight of the food composition. Fruit ingredients suitable for use in a food composition provided herein include fresh or frozen whole fruit or fruit pieces, fruit juice, fruit puree, fruit juice concentrate, and the like, or a combination thereof. As used herein, the term "fruit" can include can include any edible portion of a plant, including fruits, stems, leaves, roots, and the like, or combinations thereof. Suitable sweeteners include any caloric or non-caloric sweetener, including table sugar, honey, molasses, syrups (e.g., maple or agave syrup), stevia extract, and the like, or combinations thereof.

In some embodiments, a food composition provided herein can contain inclusions in an amount of up to 20% by weight of the food composition. Inclusions suitable for use in a food composition provided herein include, for example, dried whole fruit or fruit pieces, nuts, seeds, confectionaries, or the like, or combinations thereof.

In some embodiments, a food composition provided herein can include other appropriate ingredients, such as colorants, flavorants, fibers (e.g., wheat bran, oat bran, oat fiber, soluble corn fiber, inulin, or the like), or preservatives (e.g., salts, potassium sorbate, and the like). However, in some embodiments, a food composition provided herein contains substantially no preservatives. As used herein, a preservative does not refer to components naturally occurring in milk ingredients (including cultures included in fermented milk), oats, fruit ingredients, or sweeteners suitable for use in a food composition provided herein, nor does a preservative refer to an acidulent as described below.

In some embodiments, a food composition provided herein consists essentially of a milk ingredient and oats. In some embodiments, a food composition provided herein consists essentially of a milk ingredient, oats, and an acidulent. As used herein, "consisting essentially of" refers to a composition containing less than 1%, less than 0.1%, less than 0.05%, or less than 0.02% of other ingredients.

A food composition provided herein has a pH of 4.8 or less (e.g., 4.6 or less, 4.5 or less, 3.5 to about 4.6, or about 4.0 to about 4.6). A pH of 4.8 or less helps to maintain stability at 4° C. In some embodiments, a food composition can include an acidulant in order to achieve the desired pH. Acidulents suitable for use in a food composition include, for example, organic acids (e.g., citric acid, lactic acid, malic acid, and the like), acidic fruit juices or juice concentrates (e.g., lemon juice, lime juice, and the like), or acidic fruit pieces or purees.

A food composition provided herein has a texture that is similar to overnight oats. In some embodiments, a food composition provided herein has a texture that includes a peak force of at least 500 g (e.g., at least 800 g, at least 1200 g, at least 3000 g, at least 4000 g, or at least 5000 g) force. As used herein, peak force is measured on a sample at room temperature in a mini-Kramer shear cell using a TA.XTplus texture analyzer fitted with a 5 kg load cell using Exponent software with the following settings: test mode: compression; pre-test speed: 20 mm/sec; test speed: 2 mm/sec; post-test speed: 10 mm/sec; target mode: distance; trigger type: pre travel; trigger distance 70 mm; break mode: off; stop plot at: start position; tare mode: auto; advanced options: on; control oven: disabled; wait for temperature: no; frame deflection correction: off.

In some embodiments, a food composition provided herein has a texture that includes a firmness of at least 400 g (e.g., at least 500 g, at least 600 g, or at least 700 g) force. Firmness of a food composition can be roughly correlated with a sensory perception of hardness when first chewed. As used herein, firmness is measured on a sample at room temperature in a mini-Kramer shear cell using a TA.XTplus texture analyzer (Stable Micro Systems, Surrey, United Kingdom) fitted with a 5 kg load cell using Exponent software with the following settings: calibrate probe height to the bottom of Kramer Shear cell: 96 mm; test mode: compression; pre-test speed: 20 mm/sec; test speed: 2 mm/sec; post-test speed: 10 mm/sec; target mode: distance, 25 mm; trigger type: pre travel; trigger distance 70 mm; break mode: off; stop plot at: start position; tare mode: auto; advanced options: on; control oven: disabled; wait for temperature: no; frame deflection correction: off. Firmness is measured as the average force within the area under the force curve from the first 20 g force registered to the first 1 g force after peak force is registered.

In some embodiments, a food composition provided herein can have a protein content of at least 5% (e.g., at least 6%, at least 7%, or at least 10%) by weight of the food composition. The protein content of a food composition provided herein can be adjusted by adjusting the amounts and types of ingredients included in the food composition. For example, increasing the amount of oats, especially oats having a protein content of at least 18%, can increase average protein content. In another example, protein content can be increased by using a milk ingredient having a relatively high protein concentration, such as a strained yogurt (e.g., "Greek" yogurt).

In some embodiments, a food composition provided herein can have a fiber content of at least 1.5% (e.g., at least 2%, or at least 2.5%) by weight of the food composition. In some embodiments, a food composition provided herein can have a beta glucan content of at least 0.6% (e.g., at least 0.7%, at least 0.75%, or at least 1%) by weight of the food composition. In some embodiments, fiber content of a food composition can be provided solely from one or more of the included milk ingredient, oats, fruit ingredient, sweetener, and inclusions. However, in some embodiments, fiber content of a food composition can include added fiber (e.g., wheat bran, oat bran, oat fiber, inulin, or the like).

In some embodiments, a food composition provided herein can have a slowly digestible starch (SDS) content of at least 3% (e.g., at least 4%, at least 5%, or at least 6%) by dry weight basis. As used herein, SDS content is measured using the Englyst method. As used herein, the term "Englyst Method" refers to an in vitro methodology developed by Englyst and others (Englyst et al., 1992, Eur. J. Clin. Nutr. 46 (Suppl. 2), 33-50) to classify starch based on its digestibility. The Englyst Method determines the amount of glucose released after a sample of interest is incubated with a combination of digestive enzymes (i.e. amylases, amyloglucosidases, invertases, etc.). The amount of glucose released after 20 minutes (G20) is denominated rapidly available glucose (RAG). The glucose released between 20 and 120 minutes (G120-G20) is denominated slowly available glucose (SAG). Slowly digestible starch (SDS) is calculated by multiplying slowly available glucose (SAG) by 0.9 (Englyst et al., 1992, Eur. J. Clin. Nutr. 46 (Suppl. 2), 33-50).

In some embodiments, a food composition provided herein can include a live and active culture. A live an active culture can include one or more lactic acid producing bacteria (e.g., *Lactobacillus delbrueckii* sub sp. *bulgaricus, Strepotcoccus thermophilus, Bifidobacterium lactis*, and the like). In some embodiments, lactic acid producing bacteria can be selected for inclusion in a food composition provided herein based on their ability to survive high pressure pasteurization. See, e.g., U.S. Pat. No. 7,854,950, the disclosure of which is incorporated herein by reference.

Method of Manufacture

Food compositions provided herein can be produced by combining the desired ingredients using any appropriate method. Ingredients can be mixed sufficiently to coat or envelop oats with a milk ingredient. Contact of oats with a milk ingredient provides a benefit of hydrating the oats upon high pressure pasteurization of the mixture. In some embodiments, a food composition provided herein can have a peak force of at least 500 g (e.g., at least 1000 g, at least 3000 g, or at least 5000 g) force prior to high pressure pasteurization. In some embodiments, a food composition provided herein has a texture that includes a firmness of at least 200 g (e.g., at least 300 g, at least 600 g, or at least 700 g) force prior to high pressure pasteurization.

In some embodiments, a milk ingredient can be made or processed prior to combining it with oats and any optional ingredients. For example, a yogurt or kefir can be made using any known technique prior to combining with oats. See, for example, U.S. Pat. No. 6,399,122, U.S. Patent Application Pub. No. 2016/0309732, U.S. Pat. Nos. 5,820,903, 9,040,107, 3,950,544, 5,979,300, and 5,055,309, the disclosures of which are incorporated by reference herein. In another example, a milk ingredient can be strained or filtered prior to combining it with oats an any optional ingredients. See, for example, U.S. Pat. Nos. 7,829,130, 5,654,025, and 5,762,989, the disclosures of which are incorporated by reference herein.

A food product provided herein is produced using a high pressure pasteurization process. As discussed above, high pressure pasteurization conditions are selected to achieve sufficient moisture incorporation into oats to mimic the texture of soaked oats in overnight oats without making them too soft. In addition, high pressure pasteurization conditions are selected to provide a food composition a shelf stability at 4° C. of at least 60 days (e.g., at least 75 days, or at least 90 days).

High pressure pasteurization conditions suitable for use in a method of making a food product provided herein include a pressure of at least 580 MPa (e.g., from about 580 MPa to about 655 MPa, from about 585 MPa to about 650 MPa, or about 590 MPa).

High pressure pasteurization conditions can be maintained for sufficient time to achieve the desired hydration of oats in a food composition. For example, high pressure pasteurization conditions can be maintained for at least 2 minutes (e.g., at least 5 minutes, about 2 minutes to about 15 minutes, or about 4 minutes to about 12 minutes, or about 8 minutes to about 12 minutes). High pressure pasteurization conditions can be adjusted to achieve the desired food product texture and a shelf stability at 4° C. of at least 60 days. Generally, in order to achieve similar results, high pressure pasteurization conditions at a lower pressure can be held for a longer period of time than high pressure pasteurization conditions at a higher pressure. Similarly high pressure pasteurization conditions can be adjusted based on pH and water activity to achieve a desired texture and shelf stability at 4° C. of at least 60 days. For example, high pressure pasteurization conditions suitable for use in a method provided herein can include a pressure of about 590 MPa for 2 minutes for a food composition having a water activity 0.98 and pH of 3.7. In another example, high pressure pasteurization conditions suitable for use in a method provided herein can include a pressure of about 590 MPa for 6 minutes for a food composition having a water activity of 0.98 and a pH of 4.5. High pressure pasteurization conditions can be adjusted based on shelf stability studies, texture analysis, and/or consumer preferences.

Generally, high pressure pasteurization used in methods provided herein is performed at a temperature of 50° C. or less (e.g., 40° C. or less, 25° C. or less, about 0° C. to about 25° C., about 0° C. to about 10° C., or about 4° C.).

Generally, high pressure pasteurization is performed on a food composition in a container. Any container can be used, so long as the container is capable of maintaining integrity during high pressure pasteurization. In some embodiments, a container used in high pressure pasteurization is packaging suitable for storage, transport, and/or sale of the food composition.

Food Products

A food product provided herein includes a food composition as described herein. A food product can include a package enclosing the food composition. Any package can be use, but particularly useful packages include packages that are suitable for use in high pressure pasteurization. Any size or style of packaging can be used. For example bulk packaging, such as large bags or totes can be used, or individual serving size packages, such as cups, packets, or tubes can be used.

In some embodiments, a food product can include any other suitable food composition, such as a fruit preparation or a sauce (e.g., chocolate or caramel sauce). In some embodiments, a food composition can be repackaged to make a food product that may or may not include other food compositions. For example, a bulk packaged food composition can be used to fill cups along with a fruit preparation or toppings, such as nuts or granola, to make a food product, such as a parfait or sundae.

EXAMPLES

Example 1

Several oat varieties were tested to determine their water absorption rate using the method for measuring absorption rate in oats is the American Association of Cereal Chemists International Water Hydration (Absorption) of Rolled Oats method (AACCI Method 56-40.01, Approved Sep. 16, 1998). Oat varieties with different absorption rates were blended, then combined at a rate of 25% by weight oats with 75% by weight plain yogurt base, sealed in a plastic bag, and high pressure pasteurized at 86,000 psi (593 MPa) at 4° C. for 6 minutes. The pasteurized compositions were held in a refrigerator for 24 hours prior to tasting. Table 1 shows the oat blends and tasting preference of each blend.

TABLE 1

| | | Oat type by absorption rate | | | |
|---|---|---|---|---|---|
| Sample | Yogurt content (% by weight) | 60-100 grams water per 50 g oats (% by weight) | 30-59 grams water per 50 g oats (% by weight) | 5-29 grams water per 50 g oats (% by weight) | Average liking score (scale: 1-9) |
| 1 | 75 | 25 | 0 | 0 | 5 |
| 2 | 75 | 0 | 0 | 25 | 4 |
| 3 | 75 | 0 | 6.2 | 18.8 | 6 |
| 4 | 75 | 0 | 12.5 | 12.5 | 8.5 |
| 5 | 75 | 0 | 25 | 0 | 6 |

As shown in Table 1, on a scale of 1-9, all of the oat blends were acceptable (score of at least 4). However, Sample 2 containing only oats at the lowest absorption rate were least favored as being chewier than the others. Samples containing either all oats having an intermediate absorption rate (30-59 g water per g oats) or a combination of intermediate and low (5-29 g water per g oats) absorption rates was most preferred. Each sample had at least a portion of the oats being visually distinct as oats. However, samples containing intermediate absorption rate oats, low absorption rate oats, or a combination of intermediate and low absorption rate oats had more oats that were visually distinct.

Example 2

Samples were made with oats, plain yogurt, and other ingredients (fruit, sugar, citric acid) according to Table 2 and subjected to texture analysis, including peak force and firmness measurements, before and after high pressure pasteurization. High pressure pasteurization was performed at 593 MPa and 4° C. for 6 minutes. The average results of duplicate samples are shown in Table 3.

TABLE 2

| | | Oat type by absorption rate | | | |
|---|---|---|---|---|---|
| Sample | Yogurt content (% by weight) | 60-100 grams water per 50 g oats (% by weight) | 30-59 grams water per 50 g oats (% by weight) | 5-29 grams water per 50 g oats (% by weight) | Other (% by weight) |
| 1 | 80 | 14 | 0 | 0 | 6.5 |
| 2 | 75 | 19 | 0 | 0 | 6.5 |
| 3 | 80 | 0 | 7 | 7 | 6.5 |
| 4 | 75 | 0 | 9.5 | 9.5 | 6.5 |

TABLE 3

| | Texture Before HPP | | Texture After HPP | |
|---|---|---|---|---|
| Sample | Peak force (g) | Firmness (g) | Peak force (g) | Firmness (g) |
| 1 | 1143 | 325 | 1534 | 707 |
| 2 | 386 | 174 | 822 | 280 |
| 3 | 2036 | 340 | 5925 | 724 |
| 4 | 5675 | 938 | 7573 | 1005 |

As can be seen in Table 3, texture values increased after HPP treatment. Liking of samples was acceptable in each sample, but generally increased with increasing texture values.

Thus, embodiments of food compositions and food products containing oats and a milk ingredient, and methods of making and using such food compositions and food products are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A food product comprising:

a food composition including a milk ingredient and oats, the oats being about 10% to about 25% by weight of the food composition, the food composition having a pH of 4.8 or less, and a texture with a firmness of at least 400 g force and/or peak force of at least 500 g force, wherein the food composition is a pasteurized food composition in a container treated to high pressure pasteurization under conditions sufficient to produce the texture with the firmness of at least 400 g force and/or peak force of at least 500 g force and shelf stability at 4° C. of at least 60 days.

2. The food product of claim 1, wherein the milk ingredient comprises a fermented milk.

3. The food product of claim 1, wherein the food composition consists essentially of the milk ingredient and the oats.

4. The food product of claim 1, wherein the food composition consists essentially of the milk ingredient, the oats, and an acidulent.

5. The food product of claim 1, wherein the food composition further includes up to 10% of a fruit ingredient, a sweetener, or a combination thereof.

6. The food product of claim 1, wherein the oats comprise oats having an absorption rate of 60 grams water per 50 grams oats or less.

7. The food product of claim 1, wherein the oats comprise oats having a protein content of at least 18% by weight of the oats.

8. The food product of claim 1, wherein the food composition has a slowly digestible starch content of at least 3% by dry weight basis of the food composition.

9. The food product of claim 1, wherein the food composition has a fiber content of at least 1.5% by weight of the food composition.

10. The food product of claim 1, wherein the food composition has a protein content of at least 5% by weight of the food composition.

11. A method of making a packaged food product, the method comprising:

a. providing a packaged food composition including:
   i. a package, and
   ii. a food composition enclosed in the package, the food composition including a milk ingredient and oats, with an oat content of from about 10% to about 25% by weight of the food composition, the food composition having a pH of 4.8 or less, and a texture comprising a firmness of at least 400 g force, a peak force of at least 500 g force, or both; and
b. treating the packaged food composition to high pressure pasteurization under conditions sufficient to produce the packaged food product, the packaged food product having shelf stability at 4° C. of at least 60 days.

12. The method of claim 11, wherein the high pressure pasteurization conditions comprise a pressure of at least 580 MPa.

13. The method of claim 12, wherein the high pressure pasteurization conditions comprise maintaining the pressure for a duration of at least 2 minutes.

14. The method of claim 13, wherein the high pressure pasteurization conditions comprise maintaining the pressure at about 590 MPa for a duration of at least 6 minutes.

15. The method of claim 11, wherein the milk ingredient comprises a fermented milk.

16. The method of claim 11, wherein the food composition consists essentially of the milk ingredient and the oats.

17. The method of claim 11, wherein the food composition further includes up to 10% of a fruit ingredient, a sweetener, or a combination thereof.

* * * * *